(12) United States Patent
Mori

(10) Patent No.: US 6,978,762 B2
(45) Date of Patent: Dec. 27, 2005

(54) CONTROL SYSTEM FOR INTERNAL COMBUSTION ENGINE

(75) Inventor: Junichi Mori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/048,878

(22) Filed: Feb. 3, 2005

(65) Prior Publication Data

US 2005/0172931 A1    Aug. 11, 2005

(30) Foreign Application Priority Data

Feb. 9, 2004    (JP)    ................ 2004-032643

(51) Int. Cl.[7] ............................................. F02B 17/00
(52) U.S. Cl. ..................... 123/430; 123/431
(58) Field of Search ................ 123/430, 431

(56) References Cited

U.S. PATENT DOCUMENTS

2005/0098154 A1 * 5/2005 Ohtani ........................ 123/431
2005/0109020 A1 * 5/2005 Ichise et al. .................. 60/285
2005/0178360 A1 * 8/2005 Satou .......................... 123/431

FOREIGN PATENT DOCUMENTS

| JP | A 63-154816 | 6/1988 |
| JP | A 6-193496 | 7/1994 |
| JP | A 2002-364409 | 12/2002 |

* cited by examiner

Primary Examiner—John T. Kwon
(74) Attorney, Agent, or Firm—Oliff & Berridge, PLC

(57) ABSTRACT

In an internal combustion engine equipped with an injector for cylinder-inside injection to inject fuel into a cylinder and an injector for intake port injection to inject fuel into an intake port, both the injectors being switched for use depending upon operating conditions, wherein when an operating condition range using either one of the first or the second injector is switched to an operating condition range using the other one thereof, the amount of fuel to be injected by the either one of the first or the second injector is gradually decreased and the amount of fuel to be injected by the other one is gradually increased over a predetermined period during the switching. Further, at the time of the switching, at least one of ignition timing and throttle opening angle is gradually varied.

10 Claims, 4 Drawing Sheets

CONTROL SYSTEM FOR INTERNAL COMBUSTION ENGINE

This application claims priority from Japanese Patent Application No. 2004-032643 filed Feb. 9, 2004, which is incorporated hereinto by reference.

BACKGROUND OF THE INVENTION

1. Field of the Invention

The present invention relates to a control system for an internal combustion engine, and more particularly, to a control system for an internal combustion engine which includes an injector for cylinder-inside injection to inject fuel into a cylinder at a high load and an injector for intake port injection to inject fuel into an intake port at low and medium loads, and which switches the fuel injection from one of the injectors to the other thereof for use depending on operating conditions.

2. Description of the Related Art

In general, there is known an internal combustion engine that includes an injector for cylinder-inside injection to inject fuel into a cylinder and an injector for intake port injection to inject fuel into an intake port and is adapted to switch from one of these injectors to the other for use depending on operating condition ranges of the engine, which is disclosed in Japanese Patent Application Laid-open No. 63-154816, No. 2002-364409, and No. 6-193496 or the like.

According to a system described in the Japanese Patent Application Laid-open No. 63-154816, in an engine adapted to be operated switching between stratified combustion by direct injection in a low-load operating range and homogeneous combustion by manifold injection in a high-load operating range, at the time of switching between the direct injection and the manifold injection, both injections are performed simultaneously to prevent a degraded ignitability caused by a delay in response or in follow-up to injection switching.

Further, a system described in the Japanese Patent Application Laid-open No. 2002-364409 realizes stratified combustion in a low-load operating range and homogeneous combustion in a high-load operating range in order to improve fuel efficiency and output characteristics, and allows fuel to be injected also by an injector for cylinder-inside injection during an operation under homogeneous combustion by a fuel injection by an injector for intake port injection shifted from an operation under stratified combustion in order to lower the temperature in the cylinder and further the temperature of the injector for cylinder-inside injection by cooling action associated with fuel vaporization, thus preventing deposits from accumulating.

Furthermore, in a system described in the Japanese Patent Application Laid-open No. 6-193496, when a fuel injection is switched from a cylinder-inside injection by an injector for cylinder-inside injection to a manifold injection by an injector for intake port injection, an intake air quantity is decreased, as well as a fuel supply quantity is increased during operation of the injector for cylinder-inside injection before the switching, and then the fuel injection is switched to an active state of the injector for intake port injection, thereby suppressing torque fluctuations. On the other hand, when switching the operation from the injector for intake port injection to the injector for cylinder-inside injection, the system increases the intake air quantity while decreasing the fuel supply quantity after switching the fuel injection from the active state of the injector for intake port injection to an active state of the injector for cylinder-inside injection.

The systems described in the above Japanese Patent Application Laid-open No. 63-154816 and No. 2002-364409 are designed for an engine to be operated switching between the stratified combustion in the low-load operating range and the homogeneous combustion in the high-load operating range where changing the form of fuel supply causes no significant torque fluctuations. Therefore, no reference is made to such torque fluctuations.

Incidentally, in an engine equipped with an injector for cylinder-inside injection to inject fuel into a cylinder at a high load and an injector for intake port injection to inject fuel into an intake port at low and medium loads, when, for example, a fuel injection is switched from the injector for intake port injection at low and medium loads to the injector for cylinder-inside injection, charging efficiency improves, compared to the case with intake port injection, with the aid of latent heat of vaporization of fuel injected by the injector for cylinder-inside injection directly into the cylinder. As a result, there occurs an increase in the intake air quantity, thus causing torque fluctuations (increase). When, on the other hand, the fuel injection is switched from the injector for cylinder-inside injection at a high load to the injector for intake port injection, the charging efficiency decreases, thus causing a change in torque fluctuations (decrease).

Accordingly, in order to suppress such torque fluctuations, application of the technology described in the above Japanese Patent Application Laid-open No. 6-193496 may be considered. However, when the technology described therein is applied to an internal combustion engine which includes an injector for cylinder-inside injection to inject fuel into a cylinder at a high load and an injector for intake port injection to inject fuel into an intake port at low and medium loads, and switches the fuel injection from one of both injectors to the other for use depending on operating conditions, there occurs all the more a problem of producing torque fluctuations at the time of the switching. The reason for this is as follows: when, for example, the fuel injection is switched from the injector for intake port injection at low and medium loads to the injector for cylinder-inside injection, charging efficiency improves, compared to the case with intake port injection, with the aid of latent heat of vaporization of fuel injected by the injector for cylinder-inside injection directly into the cylinder as stated above. As a result, there occurs a change in the intake air quantity, thus causing torque fluctuations.

SUMMARY OF THE INVENTION

It is therefore an object of the present invention to provide a control system for an internal combustion engine which can prevent torque fluctuations from occurring during a switching between an injector for cylinder-inside injection and an injector for intake port injection to eliminate such conventional problem.

In order to achieve the above object, a control system for an internal combustion engine according to one aspect of the present invention comprises an injector (first injector) for cylinder-inside Injection to inject fuel into a cylinder at a high load and an injector (second injector) for intake port injection to inject fuel into an intake port at low and medium loads, both the injectors being switched for use depending on operating conditions, wherein when an operating condition range using either one of the injector for intake port injection or the injector for cylinder-inside injection is switched to an operating condition range using the other one of the injectors, the amount of fuel to be injected by the one of the injectors is gradually decreased and the amount of fuel to be injected by the other one is gradually increased over a predetermined period during the switching.

Here, it is preferred that over the predetermined period during the switching, at least one of throttle valve opening angle and ignition timing be changed gradually from an optimum value in the operating condition range using the one of the injectors to an optimum value in the operating condition range using the other one.

With the control system for the internal combustion engine according to the one aspect of the present invention, the internal combustion engine comprises the injector for cylinder-inside injection to inject fuel into a cylinder at a high load and the injector for intake port injection to inject fuel into an intake port at low and medium loads, both the injectors being switched for use depending on operating conditions. When the operating condition range using either one of the injector for intake port injection or the injector for cylinder-inside injection is switched to the operating condition range using the other one of those injectors, the amount of fuel to be injected by the one of the injectors is gradually decreased and the amount of fuel to be injected by the other one is gradually increased over a predetermined period during the switching. Therefore, rapid torque fluctuations are not generated and shocks are thus suppressed.

Further, since over the predetermined period during the switching, at least either one of throttle valve opening angle or ignition timing be changed gradually from an optimum value in the operating condition range using the one of the injectors to an optimum value in the operating condition range using the other one, rapid torque fluctuations are prevented and consequently shocks are further suppressed.

The above and other objects, effects, features and advantages of the present invention will become more apparent from the following description of embodiments thereof taken in conjunction with the accompanying drawings.

BRIEF DESCRIPTION OF THE DRAWINGS

FIGS. 4A to 4C are graphs illustrating a process of an injector switching in the preferred embodiment of the present invention, wherein FIG. 4A shows a fuel injection quantity ratio, and FIG. 4B shows ignition timing, and FIG. 4C shows throttle valve opening angle.

DETAILED DESCRIPTION OF THE PREFERRED EMBODIMENT

A preferred embodiment of the present invention will be described below with reference to the drawings.

Figure 1:
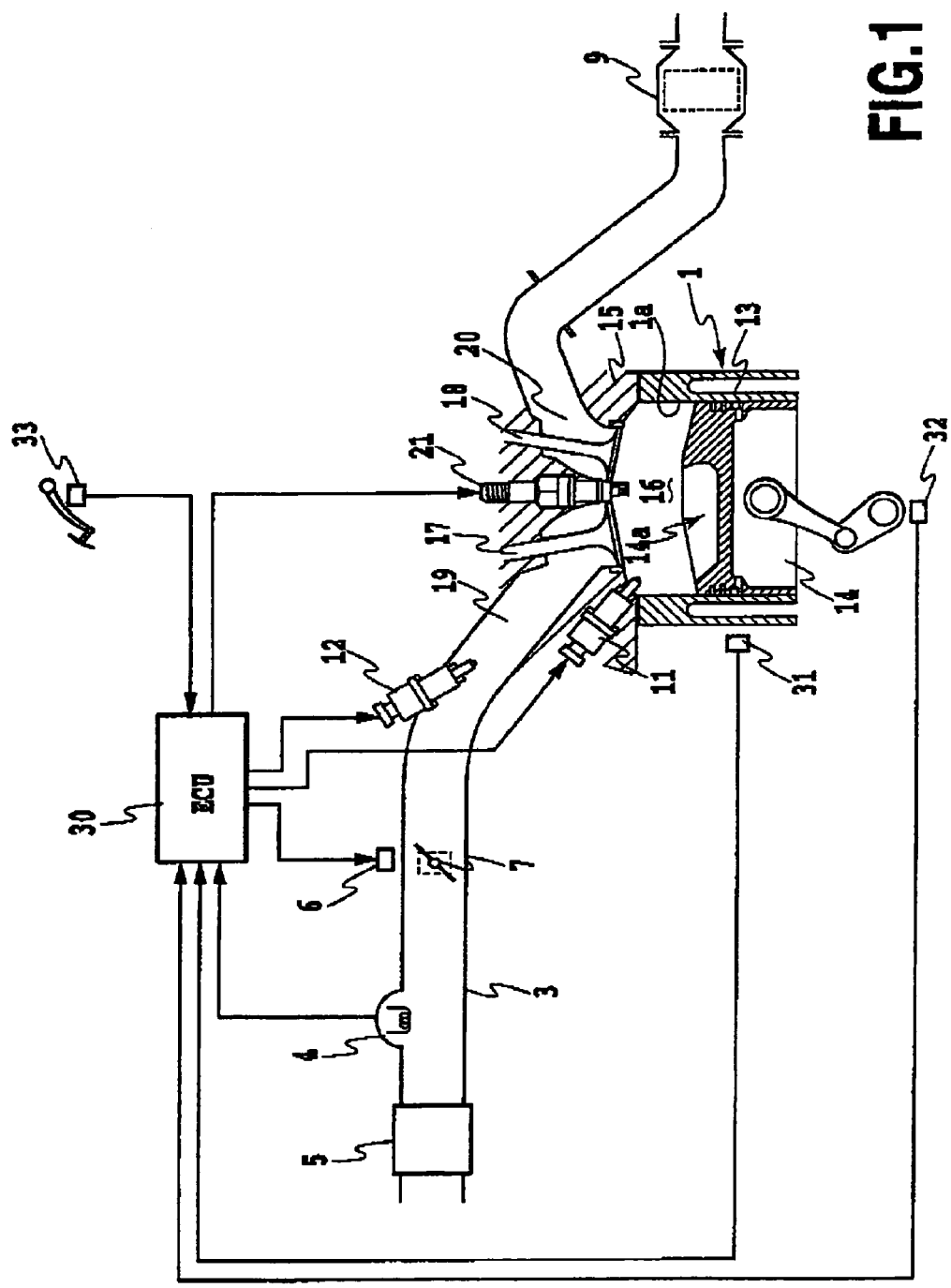
FIG. 1 is a schematic diagram showing an outline configuration of a control system for an internal combustion engine according to the present invention.

Referring first to FIG. 1 in which an outline configuration diagram of a control system for an internal combustion engine according to the present invention is shown, the engine 1 includes a plurality of cylinders, for example, four cylinders 1a. Each of the cylinders 1a is connected to an intake duct 3 through each corresponding intake manifold and the intake duct 3 is connected to an air cleaner 5 through an air flow meter 4. A throttle valve 7 actuated by a throttle motor 6 such as a stepping motor is arranged in the intake duct 3. On the other hand, each of the cylinders 1a is coupled to a common exhaust manifold, which is in turn coupled to a three-way catalytic converter 9.

An injector 11 for cylinder-inside injection to inject fuel into a cylinder and an injector 12 for intake port Injection to inject fuel into an intake port are attached to each of the cylinders 1a. These injectors 11 and 12 are controlled individually based on an output signal from an electronic control unit 30. Further, each injector 11 for cylinder-inside injection is connected to a common fuel distribution pipe (not shown), which is in turn connected to a high-pressure pump. On the other hand, each injector 12 for intake port injection is also connected to a common fuel distribution pipe (not shown), which is in turn connected to a low-pressure pump.

Additionally, a cylinder block 13, a piston 14 having a recessed portion 14a on a top face thereof, a cylinder head 15 fastened to the cylinder block 13, a combustion chamber 16 formed between the piston 14 and the cylinder head 15, an intake valve 17, an exhaust valve 18, an intake port 19, an exhaust port 20, and an ignition plug 21 energized through an igniter (not shown) are provided. The intake port 19 is formed so that air flowing into the combustion chamber 16 generates a spiral flow around an axis of the cylinder. The recessed portion 14a is formed so as to extend from a peripheral edge portion of the piston 14 located on the side of the injector 11 for cylinder-inside injection toward a central portion of the piston 14 and further extend upward under the ignition plug 21.

Furthermore, the electronic control unit (hereinafter also referred to as ECU) 30 comprising a digital computer includes a ROM (read only memory), a RAM (random access memory), a CPU (microprocessor), input and output ports, and the like interconnected through a bidirectional bus. The air flow meter 4 generates an output voltage proportional to an intake air quantity and the output voltage of the air flow meter 4 is input to the input port of the ECU 30 through an AD converter. Also, there are provided a water temperature sensor 31 which generates an output voltage proportional to a water temperature, a speed sensor 32 which generates an output pulse representing an engine speed, and a load sensor 33 which generates an output voltage proportional to the amount of depression of an accelerator pedal (hereinafter referred to as accelerator pedal angle), and these output voltages are similarly input to the ECU 30. In addition, on the basis of the intake air quantity and engine speed obtained by the above-mentioned air flow meter 4 and speed sensor 32, respectively, values of fuel injection quantity set in accordance with operating ranges are mapped and stored beforehand in the ROM of the ECU 30. Also, with respect to the ignition timing and the throttle valve opening angle, on the basis of the accelerator pedal angle and the engine speed obtained by the load sensor 33 and the speed sensor 32, respectively, values of optimum ignition timing and throttle valve opening angle set in accordance with operating ranges are mapped and stored beforehand. Moreover, the output ports of the ECU 30 are connected to the throttle motor 6, each injector 11 for cylinder-inside injection, each injector 12 for intake port injection and the ignition plug 21 through their corresponding drive circuits.

Figure 2:
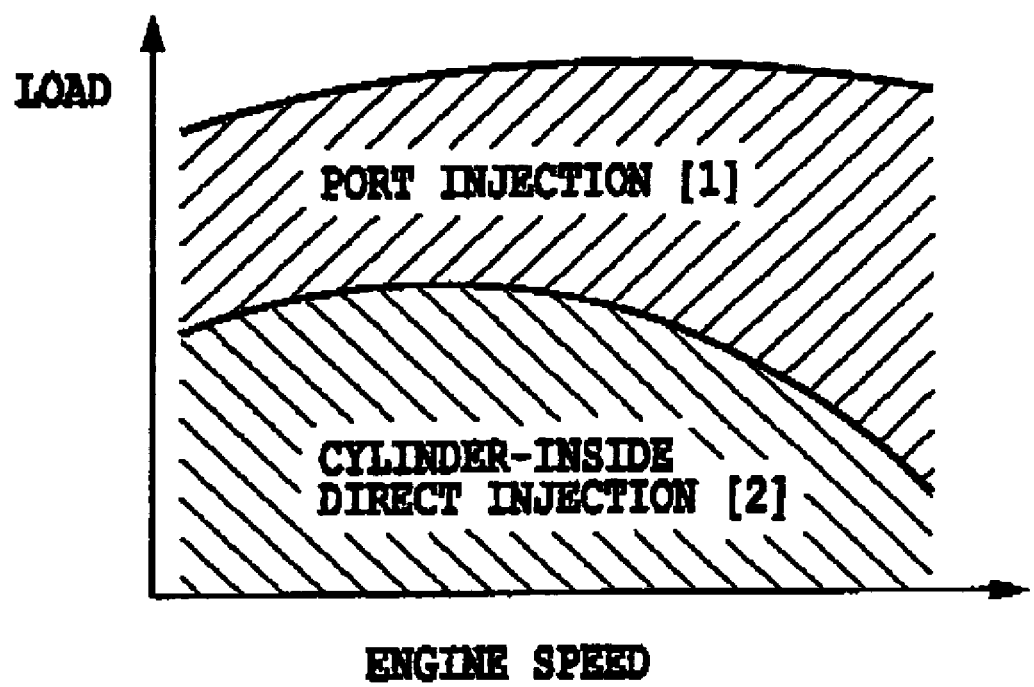
FIG. 2 is a graph showing injection forms in accordance with operating ranges in a preferred embodiment of the present invention.

Next, one example of control of a control system in the preferred embodiment having the above configuration according to the present invention will be described below. Generally, when the control for the control system is started, the electronic control unit 30 first determines an operating condition or an operating range of the engine from an engine load obtained by the load sensor 33 detecting an accelerator pedal angle and an engine speed obtained by the speed sensor 32 at predetermined time intervals. The electronic control unit 30 then selects, as shown in FIG. 2. a range of injection by the injector 12 for intake port injection (hereinafter referred to as port injection range [1]) at low and medium engine loads and a range of injection by the injector 11 for cylinder-inside injection (hereinafter referred to as cylinder-inside direct injection range [2]) at a high engine load. At the same time, the electronic control unit 30 determines a value of fuel injection quantity stored in a map with the intake air quantity and the engine speed set as parameters, and performs the control so that the determined fuel quantity is injected by the selected one of the injector 11 for cylinder-inside injection and the injector 12 for intake port injection.

Figure 3:
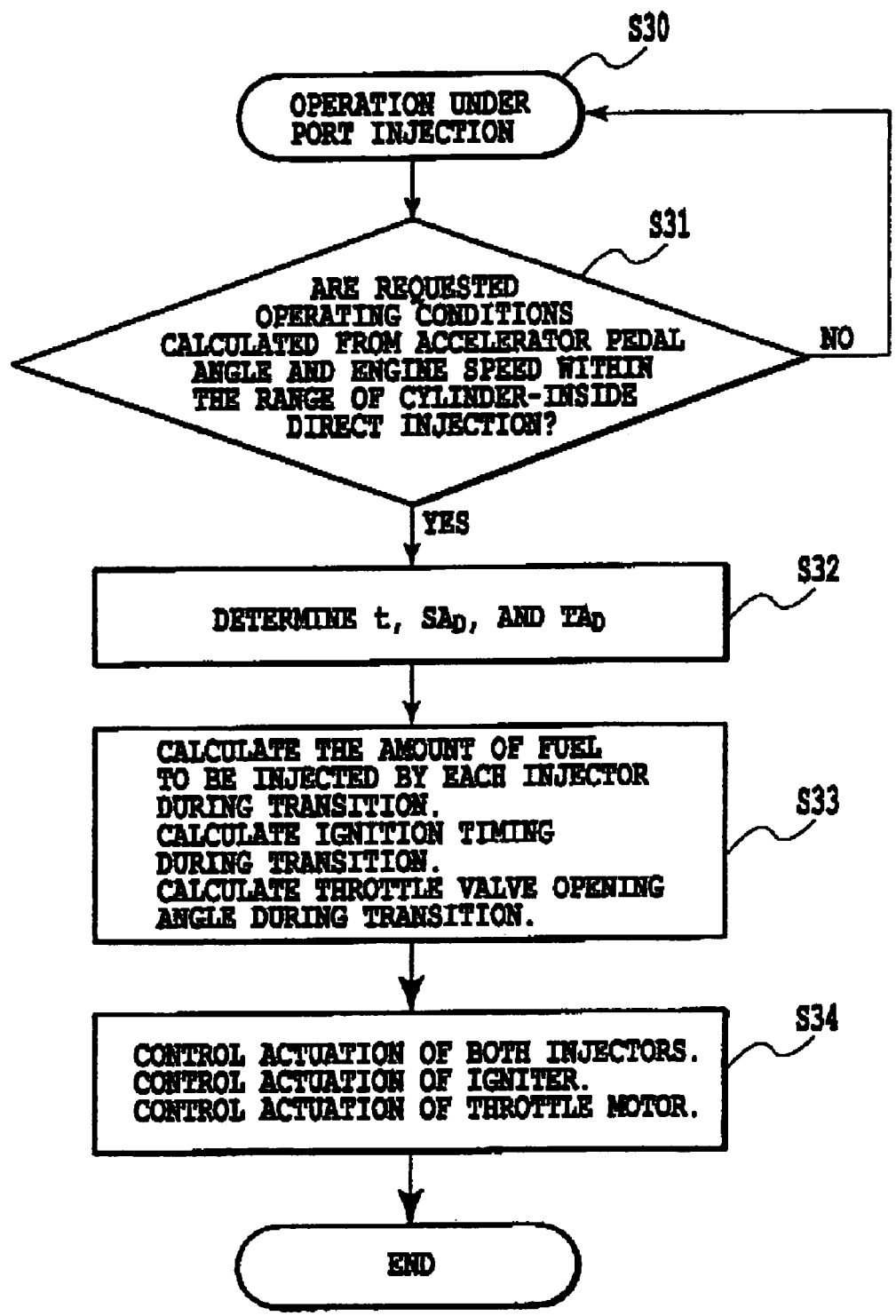
FIG. 3 is a flow chart showing one example of control in the preferred embodiment of the present invention.

Now taking as an example a case where an operating condition is shifted from the port injection range [1] by the injector 12 for Intake port injection to the cylinder-inside direct injection range [2] by the injector 11 for cylinder-inside injection, one example of control at the time of switching from the injector 12 for intake port injection to the injector 11 for cylinder-inside injection will be described with reference to a flow chart of FIG. 3. At step S30 in the flow chart of FIG. 3, an operation under port injection is being carried out and from this state the process goes to step S31, wherein whether or not there is a request to shift the current operating condition range is judged. More specifically, whether or not the operating conditions requested for the engine fall within the cylinder-inside direct injection range [2] Is judged from the engine load and the engine speed obtained by the load sensor 33 detecting the accelerator pedal angle and the speed sensor 32, respectively. If the judgment is negative ("No"), i.e. the operating conditions remain in the port injection range [1], the process returns back to step S30 to continue the operation under port injection by the injector 12 for intake port injection. On the other hand, if the judgment at step S31 is affirmative ("Yes"), i.e. there is a request for a shift to the cylinder-inside direct injection range [2], the process goes to S32.

Then, at step S32, a predetermined period t during the switching, ignition timing $SA_D$ in the cylinder-inside direct injection range, and throttle valve opening angle $TA_D$ are respectively read from the map in which optimum values thereof are determined in accordance with operating conditions by experimentation or the like. Next, the process goes to step S33, wherein the amount of fuel to be injected by each injector, ignition timing, and throttle valve opening angle in the predetermined period t during the transition are calculated.

Figure 4A:
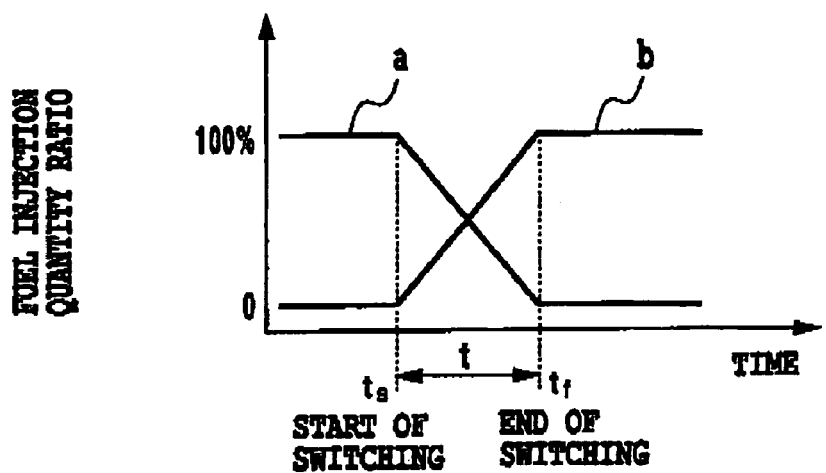

The total fuel injection quantity supplied to the engine 1 is obtained as a value stored in the map with the intake air quantity and the engine speed set as parameters as described above, and before a starting point $t_s$ of the switching, the total fuel injection quantity is injected 100% by the injector 12 for intake port injection as shown in FIG. 4A and no fuel is injected by the injector 11 for cylinder-inside injection. Then, in order that the total fuel injection quantity is injected 100% by the injector 11 for cylinder-inside injection and the amount of fuel injected by the injector 12 for intake port injection is zero at the end point $t_f$ of the switching after a lapse of the predetermined period t, the amount of fuel to be injected by each injector is calculated so that the amount of fuel to be Injected by the injector 12 for intake port injection is gradually decreased (refer to a in FIG. 4A) and the amount of fuel to be injected by the injector 11 for cylinder-inside injection is gradually increased (refer to b in FIG. 4A).

Figure 4B:
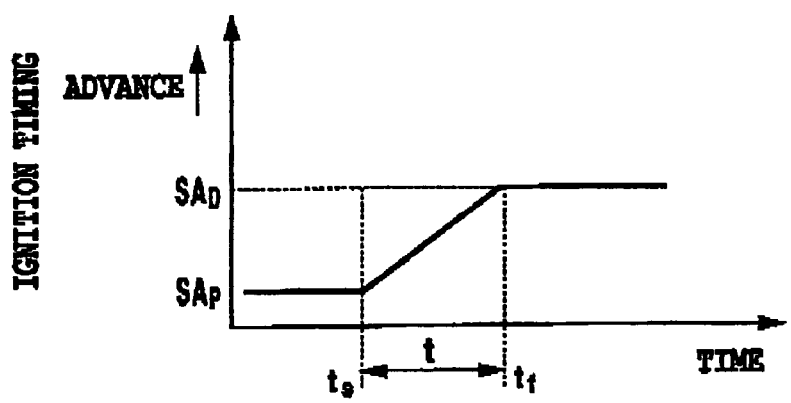

Also, the ignition timing is obtained as a value stored in the map with the accelerator pedal angle and the engine speed set as parameters, and before the starting point $t_s$ of the switching, the engine is operated at an optimum ignition timing $SA_P$ in the port injection range. Accordingly, based on the optimum ignition timing $SA_D$ in the cylinder-inside direct injection range read at step S32 and the optimum ignition timing $SA_P$ in the port injection range, the ignition timing in the predetermined period t during the transition is calculated so that the ignition timing changes gradually from the optimum value $SA_P$ in the port injection operating condition range to the optimum value $SA_D$ in the cylinder-inside direct injection operating condition range as shown in FIG. 4B.

Figure 4C:
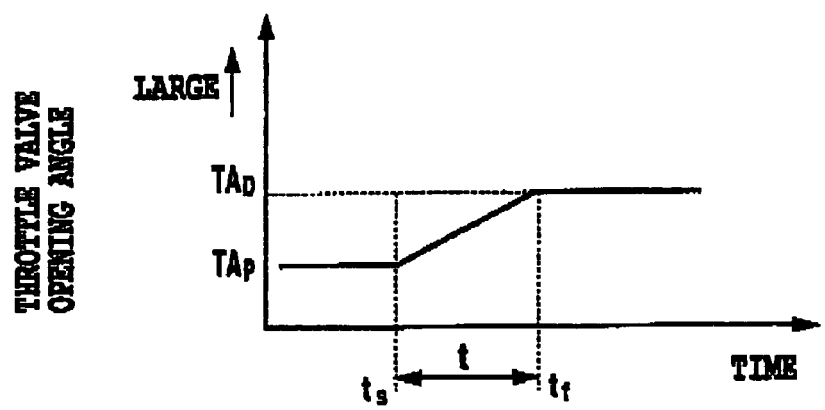

The throttle valve opening angle is similarly obtained as a value stored in the map with the accelerator pedal angle and the engine speed set as parameters, and before the starting point $t_s$ of the switching, the engine is operated at an optimum throttle valve opening angle $TA_P$ in the port injection range. Accordingly, based on the optimum throttle valve opening angle $TA_D$ in the cylinder-inside direct injection range read at step S32 and the optimum throttle valve opening angle $TA_P$ in the port injection range, the throttle valve opening angle in the predetermined period t during transition is calculated so that the throttle valve opening angle changes gradually from the optimum value $TA_P$ in the port injection operating condition range to the optimum value $TA_D$ in the cylinder-inside direct injection operating condition range as shown in FIG. 4C.

And then, at step S34, based on the injection ratio during the transition calculated at the above step S33, the injector 11 for cylinder-inside injection and the injector 12 for intake port injection each injects a predetermined amount of fuel for homogeneous combustion. Since the switching is performed with the fuel injection quantity ratio gradually varied, rapid torque fluctuations are not generated and consequently shocks are suppressed. Also with respect to the ignition timing and the throttle valve opening angle, the igniter (not shown) and the throttle motor 6 are driven and controlled in accordance with the respective calculated values.

In the foregoing, description has been made of control at the time of switching from the injector 12 for intake port injection to the injector 11 for cylinder-inside injection, taking as an example the case where the operating condition is shifted from the port injection range [1] by the injector 12 for intake port injection to the cylinder-inside direct injection range [2] by the injector 11 for cylinder-inside injection, but it is suggested that a similar control be performed in the case of a shifting in the opposite direction.

Further, the above fuel switching control and the ignition timing and throttle valve opening angle changing controls need not necessarily be performed simultaneously, and at least the fuel switching control should be performed. Also, the ignition timing and throttle valve opening angle changing controls need not necessarily be performed simultaneously, and at least either one of the controls may only be performed. It is, however, obvious that performing these controls simultaneously will further reduce rapid torque fluctuations, thereby suppressing shocks.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A control system for an internal combustion engine equipped with a first injector for cylinder-inside injection to inject fuel into a cylinder at a high load, and a second injector for intake port injection to inject fuel into an intake port at low and medium loads, both of the first and second injectors being switched for use depending on operating conditions, the control system comprising:

a control unit which performs a switching control in such a way that when an operating condition range using either one of the first or the second injector is switched to an operating condition range using the other one thereof, the amount of fuel to be injected by the either one of the first or the second injector is gradually decreased and the amount of fuel to be injected by the other one is gradually increased over a predetermined period during the switching.

2. The control system for the internal combustion engine according to claim 1, wherein:

said control unit controls at least either one of throttle valve opening angle or ignition timing so that at least the either one of the throttle valve opening angle or the ignition timing is changed gradually from an optimum value in the operating condition range using the either one of the first or the second injector to an optimum value in the operating condition range using the other one over the predetermined period during the switching.

3. A control system for an internal combustion engine equipped with a first injector for cylinder-inside injection to inject fuel into a cylinder and a second injector for intake port injection to inject fuel into an intake port, comprising:

a detector to detect an operating condition of the internal combustion engine;

a switching section to switch from a fuel injection by either one of the first or the second injector to a fuel injection by the other one depending on the operating condition detected by the detector; and a fuel injection quantity changing section to gradually decrease the amount of fuel to be injected by the either one of the first or the second injector while increasing the amount of fuel to be injected by the other one over a predetermined period during the switching by the switching section.

4. The control system for the internal combustion engine according to claim 3, wherein:

the fuel injection by the first injector is performed at a high load and the fuel injection by the second injector is performed at low and medium loads.

5. The control system for the internal combustion engine according to claim 4, wherein:

the predetermined period during the switching is determined at an optimum value in accordance with the operating condition.

6. The control system for the internal combustion engine according to claim 5, further comprising:

a changing section for at least either one of throttle valve opening angle or ignition timing to gradually change at least the either one of the throttle valve opening angle or the ignition timing from an optimum value in the operating condition range using the either one of the first or the second injector to an optimum value in the operating condition range using the other one over the predetermined period during the switching.

7. A control method for an internal combustion engine equipped with a first injector for cylinder-inside injection to inject fuel into a cylinder, and a second injector for intake port injection to inject fuel into an intake port, the control method comprising the steps of:

detecting an operating condition of the internal combustion engine;

switching from a fuel injection by either one of the first or the second injector to a fuel injection by the other one depending on the detected operating condition; and gradually decreasing the amount of fuel to be injected by the either one of the first or the second injector while gradually increasing the amount of fuel to be injected by the other one over a predetermined period during the switching.

8. The control method for the internal combustion engine according to claim 7, wherein:

the fuel injection by the first injector is performed at a high load and the fuel injection by the second injector performed at low and medium loads.

9. The control method for the internal combustion engine according to claim 8, wherein:

the predetermined period during the switching is determined at an optimum value in accordance with the operating condition.

10. The control method for the internal combustion engine according to claim 9, further comprising the step of:

gradually changing at least either one of throttle valve opening angle or ignition timing from an optimum value in the operating condition range using the either one of the first or the second injector to an optimum value in the operating condition range using the other one over the predetermined period during the switching.

* * * * *